June 18, 1946.　　　O. H. GRISWOLD　　　2,402,157
CONSTANT VOLUME CONNECTION FOR FLUID CONDUITS
Filed June 27, 1944　　　2 Sheets-Sheet 1
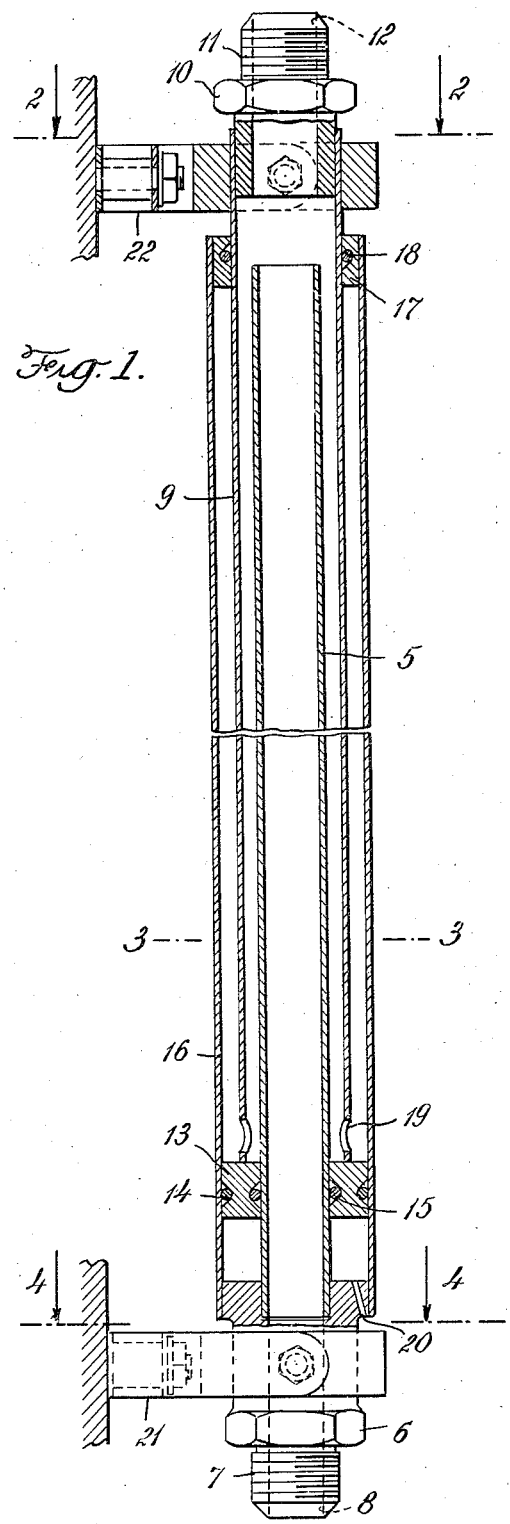
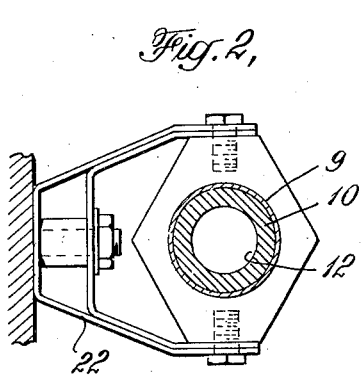
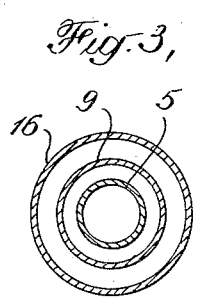
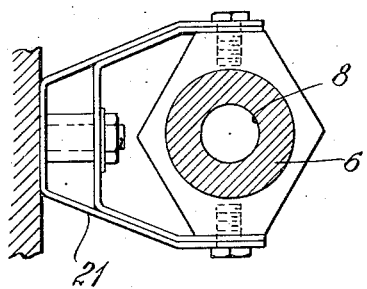
INVENTOR
Owen H. Griswold
BY
Pennie Davis Marvin & Edmonds
ATTORNEYS June 18, 1946.　　O. H. GRISWOLD　　2,402,157
CONSTANT VOLUME CONNECTION FOR FLUID CONDUITS
Filed June 27, 1944　　2 Sheets-Sheet 2
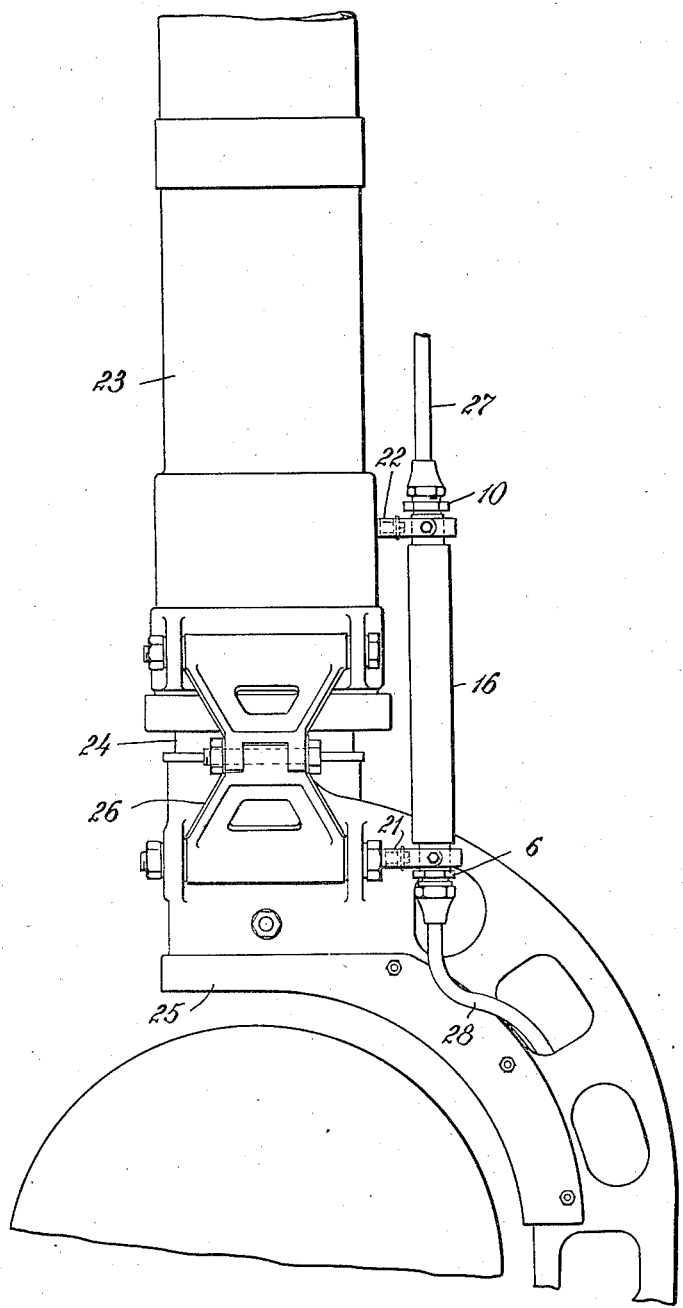
INVENTOR
Owen H. Griswold
BY
ATTORNEYS Patented June 18, 1946

2,402,157

UNITED STATES PATENT OFFICE 2,402,157

CONSTANT VOLUME CONNECTION FOR FLUID CONDUITS

Owen H. Griswold, Trenton, N. J., assignor to Kaiser Cargo, Inc., Bristol, Pa., a corporation of California Application June 27, 1944, Serial No. 542,275

6 Claims. (Cl. 244—111)

This invention relates to a constant volume connection for fluid conduits adapted for use where fluid under pressure is transmitted between two members of a structure which are not in constant relative position. While the invention is particularly designed to facilitate the application of liquid in hydraulic brake systems for aircraft, it is equally adaptable for use with gases and for general applications where similar conditions obtain.

In aircraft landing gear, each wheel is supported in a suitable frame which is connected for reciprocating movement to the oleo or shock absorbing unit. The brake which is supported on the wheel frame is supplied with fluid from a hydraulic line leading to the source of pressure fluid in the fuselage. Obviously, when the aircraft lands, there is considerable reciprocating movement between the wheel frame and the shock strut including the oleo which is connected to the fuselage.

To avoid changes in volume which would result in inefficient braking, it has been customary to employ either rubber tubing or swivel joints in metallic tubing in the connections between the fluid pressure line and the brake mechanism. Rubber tubing under pressure expands with resulting "spongy" pedal action. Furthermore, the tubing deteriorates rapidly, requiring frequent replacement. Also, the synthetic rubber which is used to resist chemical action of the brake fluid will not stand up to the temperatures required for winterization. Finally, the tube is difficult to install because minimum bend radii must be observed and considerable space is required. The use of swivel joints affords no better solution, since three are required, together with pipe fittings and supporting structure. The arrangement is costly, requires considerable space and is difficult to install.

It is the object of the present invention to provide a simple and efficient constant volume connection for fluid lines which permits relative movement of the parts upon which the connection is supported.

Another object of the invention is the provision of an improved constant volume connection adapted for use in the hydraulic line supplying fluid under pressure to the hydraulic operating mechanism of the brake on an aircraft wheel.

Other objects and advantages of the invention will be apparent as it is better understood by reference to the following specification and the accompanying drawings, in which Fig. 1 is a longitudinal section through a device embodying the invention;

Fig. 2 is a section on the line 2—2 of Fig. 1;

Fig. 3 is a section on the line 3—3 of Fig. 1;

Fig. 4 is a section on the line 4—4 of Fig. 1; and

Fig. 5 is a diagrammatic illustration in elevation showing the application of the invention to an aircraft landing gear.

Referring to Figs. 1-4 inclusive, a hollow metal tube 5 is secured at one end to a fitting 6 having a pipe connection 7 and a passage 8. The tube 5 is hereinafter referred to as the piston tube.

A second tube 9, hereinafter called the inner tube, is disposed telescopically about the piston tube 5 and is connected to a fitting 10 having a pipe connection 11 and a passage 12. At its inner end, the tube 9 is provided with a plunger 13 having packings 14 and 15 of the ring or doughnut type which co-operate with the piston tube 5 and an outer tube 16 which is secured at one end to the fitting 6. The other end of the outer tube 16 is provided with a gland 17 which also carries a packing 18 of the ring or doughnut type, co-operating with the inner tube 9. An opening 19 is provided in the inner tube 9, affording communication between the inner tube 9 and the outer tube 16. A vent 20 in the fitting 6 ensures the maintenance of atmospheric pressure in the space in front of the plunger 13.

The fitting 6 may be connected to a universal yoke 21 which is adapted to be secured to any support and permits automatic adjustment of alignment. The fitting 10 carries a similar yoke 22. The yoke 22 may be secured to any part which is movable with reference to the support for the yoke 21. As the parts reciprocate, the tubes 5 and 16 will move relatively to the tube 9 in the direction of their longitudinal axes. As the device extends, the volumetric capacity of the inner tube 9 increases in precisely the same amount as the volumetric capacity of the space between the inner tube 9 and the outer tube 16 decreases. The device is so constructed, and the dimensions are such that the capacity of the two chambers always total the same volume, and hence any change in one volume is compensated by a corresponding change in the other. Hence, regardless of movement, there can be no pumping action, and the fluid pressure in the lines connected to the device is not disturbed.

A particular application of the device is shown in Fig. 5, in which 23 is the oleo of an aircraft landing gear shock strut. The movable member 24 of the oleo is connected to the wheel frame 25.

a nut cracker 26 being provided to maintain alignment. The yoke 21 on the fitting 6 is secured to the wheel frame 25, and the yoke 22 on the fitting 10 is secured to the oleo 23. A pipe 27 connected to the fitting 10 and to a source of fluid under pressure (not shown) on the aircraft supplies the fluid to the tubes 5, 9 and 16. The fitting 6 is connected by a pipe 28 to the hydraulic actuating mechanism of the brake (not shown). As the wheel frame 25 reciprocates with reference to the oleo 23, the fluid pressure is supplied to the brake without any change of volume at the connection. Hence the brakes can be used effectively when they are most needed.

The details of the mechanism for supplying hydraulic fluid under pressure and the brake and its actuating mechanism are well known in the art and form no part of the present invention. Hence no further description thereof is necessary.

The invention as described has numerous advantages when applied to a brake line connection on aircraft. The unit is of metal except for the sealing rings or packing. Therefore there are no expansion difficulties and no deterioration due to the chemical action of the oil or to temperature change. The unit is small and fits parallel to the strut, which assures easy installation, since there are no joints or bends projecting from the oleo. Installation can be accomplished in a minimum of time, and the weight of the unit is somewhat less than that of the conventional type of installation. Finally, the unit is so designed that it can be used in practically all types of airplanes and with little modification in assembly.

As previously indicated, the invention, though particularly useful in connection with aircraft brakes, has numerous other applications in devices involving the transfer of fluid pressure, whether liquids or gases, without volume displacement, where the connected parts do not occupy a constant relative positions. It depends upon the principle that the change in volume resulting from the movement of the telescoping tubes is compensated by the modification in the capacity of another chamber which changes in size in proportion and in the opposite direction as the capacity of the relatively movable tubes increased or decreased.

Various changes may be made in the details of the device and in its application without departing from the invention or sacrificing the advantages thereof.

I claim:

1. In a constant volume connection for fluid conduits, telescoping tubes and packing means associated therewith to define three concentric intercommunicating spaces and connections to permit the flow of fluid to and from the spaces, the dimensions being such that the total volume of fluid confined within the spaces remains constant regardless of relative movement of the tubes.

2. In a constant volume connection for fluid conduits, three tubes and packing means associated therewith defining concentric spaces, one of the tubes being movable between and relatively to the other pair and having an opening affording communication between the respective spaces defined by it and the outer tube of the pair, and connections to permit the flow of fluid to and from the spaces within the tubes, the dimensions being such that the total volume of fluid confined within the tubes remains constant regardless of their relative movement.

3. In a constant volume connection for fluid conduits, a pair of concentric tubes, a third tube telescopically movable between and relatively to the pair of tubes and having an opening to the space between it and the outer tube of the pair, packing means at the ends of the outer and third tubes to confine fluid therein and connections to permit the flow of fluid to and from the spaces within the tubes, the dimensions being such that the total volume of the fluid confined within the tubes remains constant regardless of their relative movement.

4. In a constant volume connection for fluid conduits, a pair of concentric tubes, a third tube telescoping and movable between the pair, a plunger at the free end of the third tube having packing adapted to engage the inner and outer tubes of the pair, packing at the free end of the outer tube of the pair engaging the third tube, the latter tube having an opening communicating with the space within the outer tube and connections to permit the flow of fluid to and from the spaces within the tubes, the dimensions being such that the total volume of fluid confined within the tubes remains constant regardless of their relative movement.

5. In a constant volume connection for aircraft hydraulic brake systems, the combination of a shock-absorbing strut, a wheel frame, three intercommunicating tubes and packing means associated therewith defining concentric spaces, one of the tubes being mounted in the strut and the others supported on the wheel frame, and connections to deliver fluid under pressure to and from the spaces defined by the tubes, the dimensions being such that the total volume of fluid within the tubes remains constant regardless of their relative movement.

6. In a constant volume connection for aircraft hydraulic brake systems, the combination of a shock-absorbing strut, a wheel frame, and means connected respectively thereto including telescoping tubes and packing means associated therewith to define three concentric intercommunicating spaces, and connections to permit the flow of fluid to and from the spaces, the dimensions being such that the total volume of fluid confined within the tubes remains constant regardless of their relative movement.

OWEN H. GRISWOLD.